United States Patent [19]

Hall

[11] Patent Number: 4,524,948
[45] Date of Patent: Jun. 25, 1985

[54] ELECTRICALLY CONTROLLED PRESSURE TRANSDUCER VALVE

[75] Inventor: Dale G. Hall, Galena, Ohio

[73] Assignee: Ranco Incorporated, Dublin, Ohio

[21] Appl. No.: 530,510

[22] Filed: Sep. 9, 1983

[51] Int. Cl.³ .................. F16K 31/02; F16K 17/04
[52] U.S. Cl. .................................. 251/139; 251/141; 137/881; 137/DIG. 8
[58] Field of Search .............. 137/82, DIG. 8, 881, 137/877; 251/139, 141

[56] References Cited

U.S. PATENT DOCUMENTS 1,911,618  5/1933  Hapgood .......................... 251/139
4,120,214 10/1978  Todd ............................. 137/DIG. 8

FOREIGN PATENT DOCUMENTS

WO80/01502  7/1980  PCT Int'l Appl. ................ 137/82

Primary Examiner—Samuel Scott
Assistant Examiner—G. Anderson
Attorney, Agent, or Firm—Watts, Hoffmann, Fisher & Heinke

[57] ABSTRACT

An electrically controlled pressure transducer valve comprises a controlled output pressure passage, an input passage communicating with a source of pressure and with the output passage, a vent passage communicable with the output passage, and a valve for controllably varying the degree of communication through the vent passage to govern the output pressure level. The valve comprises a valve member defining opposed sides forming first and second effective pressure areas respectively exposed to output and vent pressures, the valve member being movable in response to changes in differential pressure applied to the effective pressure areas. An electromagnetic actuator exerts magnetic force on the valve member and includes a coil connected to an electrical power source for producing an electromagnetic field, a core extending within the coil and a pole piece. The actuator is constructed and arranged to establish a concentrated magnetic flux path extending between the pole piece and the valve member through one valve member side.

9 Claims, 2 Drawing Figures

ELECTRICALLY CONTROLLED PRESSURE TRANSDUCER VALVE

DESCRIPTION

1. Technical Field

The present invention relates to pressure transducer valves and more particularly relates to electrically controlled pressure transducer valves for governing operation of fluid actuators in response to electrical signals.

2. Background Art

In environments such as automotive vehicles the use of sophisticated integrated circuits and allied electronic devices for producing electrical output signals in response to sensed vehicle operating conditions has become relatively commonplace. Vehicle components such as EGR valves, passenger compartment heater control valves, passenger compartment temperature controlling air stream blend doors and other mechanisms are actuated in response to changes in sensed vehicle operating conditions. Powerful actuators are frequently required to operate such mechanisms. Electrically powered actuators have not been satisfactory whereas pneumatic or hydraulic actuators have been found to be well adapted for these uses and environments. Accordingly, transducers for converting low energy electrical signal values to output pressure levels have been sought for various automotive vehicle applications.

Different kinds and types of electrically controlled pressure valves have been proposed. While most of these valves have been used to control gas or air flows and pressures, some have been used for controlling liquid flow rates or pressures, for example in fuel metering systems and fuel injectors.

The least complicated of these valve constructions have operated on an on-off basis, i.e. a valve element moves between alternative positions in response to electrical signals to alter output pressure between distinct levels. Valves that produced modulatable output pressures were relatively complicated. For example, modulating pressure valves have frequently employed diaphragms associated with multipart assemblies. In many cases the valves employed electromagnets having heavy, bulky pole pieces and cores which were not well adapted to use in automotive vehicles.

DISCLOSURE OF THE INVENTION

The present invention provides a new and improved pressure transducer valve of simple, light weight, compact, inexpensive construction for producing controllable fluid output pressures in response to low level electrical control signals.

An electrically controlled pressure transducer valve constructed according to the invention comprises a controlled output pressure passage, an input passage communicating with a source of pressure and with the output passage, a vent passage communicable with the output passage, and a valve for controllably varying the degree of communication through the vent passage to govern the output pressure level. The valve comprises a valve member defining opposed sides forming first and second effective pressure areas respectively exposed to output and vent pressures, the valve member being movable in response to changes in differential pressure applied to the effective pressure areas.

An electromagnetic actuator exerts magnetic force on the valve member and includes a coil connected to an electrical power source for producing an electromagnetic field, a core extending within the coil and a pole piece. The pole piece has one end section connected to the core, a thin walled tubular sleeve section closely surrounding the coil and a second end section having a peripheral portion extending circumferentially about the core and disposed adjacent the valve member. The end section peripheral portion establishes a concentrated magnetic flux path extending between the pole piece and the valve member through a first valve member side.

A nonmagnetic valve seat is engageable with the first valve member side for blocking communication between the vent passage and the output passage. The valve seat is positioned to prevent the valve member from engaging the core and defines, with the valve face, one of the first and second effective pressure areas.

The valve member is biased toward engagement with the valve seat and acted upon by differential pressure forces and electromagnetic forces to govern the flow through the vent passage and thus controls the valve output pressure.

Other features and advantages of the invention will become apparent from the following description of preferred embodiments and from the drawings which form part of the specification.

BEST MODE FOR CARRYING OUT THE INVENTION

Figure 1:
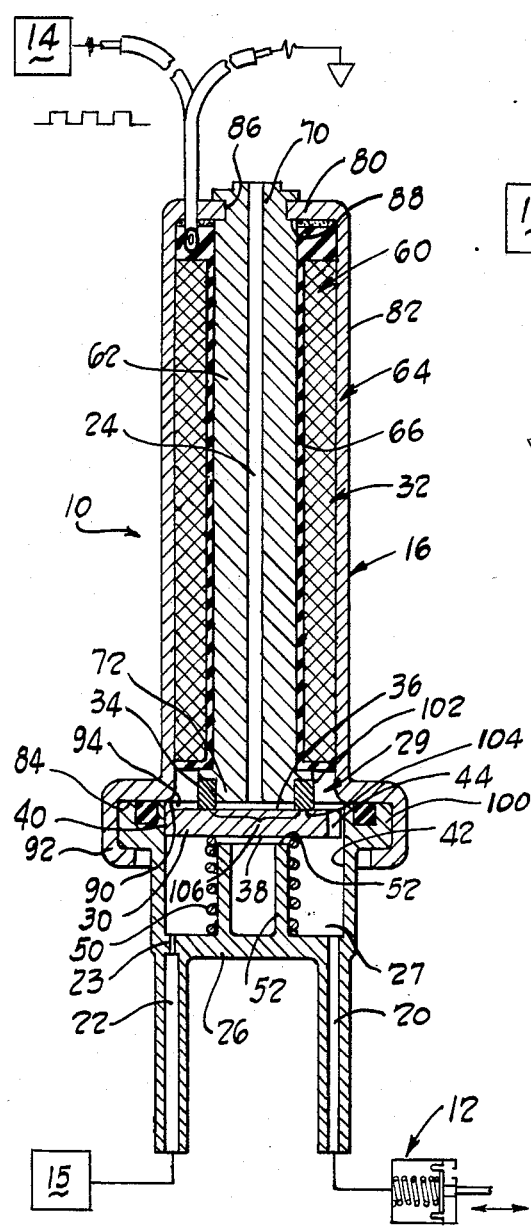
FIG. 1 is a schematic illustration of a control system having a transducer valve constructed according to the invention illustrated in cross section; and, FIG. 2 is a cross sectional view of a modified transducer valve constructed according to the invention.

A control system 10 for use in an automotive vehicle is schematically illustrated in FIG. 1 of the drawings. The control system 10 comprises a pneumatic actuator device 12 which is supplied with controlled pressure to perform an actuating function in response to operation of a condition responsive electrical signal generator 14. The actuator 12 is supplied with operating vacuum pressure from a vacuum pressure source 15 via an electrically controlled pressure transducer valve 16 which is connected to the output of the signal generator 14.

The transducer valve 16 is so constructed and arranged that as the value of the electrical signal from the generator 14 is changed the level of vacuum pressure supplied to the actuator device 12 is changed correspondingly. When the signal value from the generator 14 is stabilized at a particular level, the vacuum supply to the actuator device 12 likewise stabilizes at a level determined by the electrical signal level.

For the purposes of this description the system 10 is assumed to control the positioning of an EGR valve in a spark ignition internal combustion engine. The signal source 14 is associated with appropriate sensors for monitoring engine operating conditions (such as engine speed, throttle setting, etc.) which collectively dictate the amount of engine exhaust gas to be recirculated at any given time. The signal source includes electrical circuitry for producing an output signal whose value changes with sensed changes in engine operating conditions. The output signal is preferably in the form of low energy pulse width modulated pulses (15 V., 0.5 amps), but other kinds of electrical signals can be generated and used in the system 10.

The actuator 12 positions the EGR valve in accordance with the electrical signal values produced by the signal source 14 so that the flow of recirculated exhaust gas is controlled according to the sensed engine operating conditions. The actuator 12 can be of any suitable or conventional type and therefore is illustrated schematically as a flexible diaphragm urged by a spring to a "parked" position and which is movable against the spring force when communicated to vacuum pressure by the valve 16. The diaphragm carries an operating rod which shifts the EGR valve between a fully closed position (when the actuator is "parked") and a fully opened position when a relatively high level of vacuum is supplied to the actuator.

The pressure source 15 is a source of vacuum pressure formed, for example, by a vacuum pump operated from the vehicle engine or by the engine intake manifold which commonly operates at subatmospheric, or vacuum pressure.

The transducer valve 16 functions to produce an actuator operating output pressure which is variable between the source pressure level and the ambient atmospheric pressure. The valve 16 includes an output pressure passage 20 for communicating operating pressure to the actuator 12, a source pressure passage 22, including a flow restrictor 23, for communicating with the pressure source 15 and a vent passage 24 communicating with the ambient atmospheric pressure. In the preferred embodiment the source and output passages are formed in the base of a cup-like housing 26 and open into an output pressure chamber 27 formed by the housing 26. The vent passage communicates with the chamber via a control valve assembly 29 which is connected to the housing to close the chamber.

The control valve 29 modulates the flow through the vent passage 24 to the output pressure chamber 27. The output pressure chamber 27 is constantly communicated to the vacuum pressure source 15 via the flow restrictor 23 and accordingly the valve assembly 29 governs the pressure level established between the source pressure level and the atmospheric pressure level in accordance with the signal value from the generator 14. The valve assembly 29 comprises a movable valve member 30 situated in the chamber 27, an electromagnetic valve actuator 32 for applying a magnetic actuating force to the valve member, and a valve seat 34 relative to which the valve member 30 moves to control the output chamber pressure.

The valve member 30 is acted upon by opposed pressure and electromagnetic forces to control the output pressure level. The valve member 30 is preferably formed by a flat cylindrical disc of unmagnetized iron or similar paramagnetic material having opposed sides 36, 38 and a generally circular edge 40 disposed in close proximity to the chamber wall 42. The chamber wall 42 is shaped to conform to the valve member periphery (i.e. the wall 42 is cylindrical) and guides movement of the valve member axially within the chamber toward and away from the valve seat 34. Spaced slots 44 extend between the valve member sides 36, 38 to permit substantially unrestricted air flow between the valve member and the chamber wall 42.

The valve member 30 is biased toward engagement with the seat 34. In the preferred embodiment a helical compression spring 50, disposed in the chamber 27, reacts between valve member 30 and the base of the housing 26 to provide a predetermined constant biasing force on the valve member. Travel of the valve member away from the valve seat against the spring force is limited. In the illustrated system a mechanical stop 52 limits travel of the valve member away from the seat. The stop 52 prevents the biasing spring force magnitude from changing appreciably because the maximum travel of the valve member is quite small. The illustrated stop 52 is a cylindrical tubular element extending between the housing base and the valve member. The stop engages the valve member over a contact area sufficiently large to eliminate the possibility of the valve member becoming tipped or otherwise misaligned with respect to the surrounding chamber wall 42. The stop 52 also maintains the biasing spring in position with respect to the valve member.

The electromagnetic valve actuator 32 produces a valve member actuating force whose magnitude varies as a function of the output from the signal source 14. The actuator 32 includes a coil assembly 60, a core 62 extending through the coil assembly and a pole piece 64 connected to the core and forming a protective housing for the coil assembly. The coil assembly 60 preferably has a straight cylindrical toroidal form developed by helically winding insulated wire about a central spool 66. The spool 66 is formed of electrical insulator material and defines a straight, cylindrical central opening through the coil assembly 60. The ends of the coil wire are electrically connected to the signal source 14 and to circuit ground, respectively, so that the strength of the magnetic field produced by the coil varies in relation to variations in the electrical signal supplied from the source 14.

The core 62 is a cylindrical member extending along the coil axis and snuggly received in the central spool opening. Opposite core end portions 70, 72 project from the coil assembly 60. The vent passageway 24 is formed in and extends axially through the core. In the illustrated actuator the vent passageway opens at both core end portions.

The pole piece 64 directs the coil flux about the coil in a confined path. The pole piece 64 is a thin walled cup-like magnetically conductive metal member having one closed end section 80 connected to the core end portion 70, a central section 82 forming a sleeve closely surrounding the coil assembly 60, and a second open end section 84 adjacent the valve member side 36. The end section 80 is formed with a central opening 86 through which the core end portion 70 extends so that the pole piece end 80 is seated on a shoulder 88 at the core end. The projecting core end is peened over, or staked, against the pole piece to tightly secure the core and pole piece together with the contact between them assuring a highly conductive flux path.

The sleeve section 82 provides a highly conductive flux path along the outside of the coil while also serving as a protective coil housing. The preferred sleeve is circular in cross section and is electrically insulated from the coil by the insulation on the coil wires. Substantially all the coil flux is confined in and distributed throughout the sleeve section.

The sleeve end section 84 is constructed to maximize the magnetic force applied to the valve member 30 as well as to secure the housing 26 and valve assembly 29 together. The end section 84 defines a flux directing and concentrating portion 90 and a connecting flange portion 92. The flux directing portion 90 is formed by a narrow circumferential pole piece area disposed adjacent and confronting the valve member side 36 for channeling substantially all of the coil flux across a narrow gap 94 between the valve member side 36 and the pole piece portion 90.

The valve member and flux directing portion 90 are constructed and arranged so that the magnetic flux traversing the flux gap 94 passes through the valve member side 36. Accordingly, the valve member periphery is shaped to conform to the shape of the flux directing portion 90 (in the illustrated embodiment circular) and the valve member is sized so that it is at least of larger diametrical size than the inside dimension of the flux directing portion 90. Because of this relationship the lines of flux do not pass through the valve member edge 42. Magnetic force components directed parallel to the valve member sides 36, which might tip or tend to bind the valve member against the adjacent housing guide wall 42 are minimized by directing the flux path through the valve member side. It has been found that the transducer 16 operates substantially consistently regardless of its orientation in use. The size relationship between the flux directing portion 90 and the valve member is believed at least partly responsible for this insensitivity to orientation.

The connecting flange portion 92 is formed continuously with the flux directing portion 90 and secures the housing 26 to the valve assembly 29. In the preferred embodiment the flange portion 92 is clenched about a lip 100 extending around the open end of the housing 26. The housing lip 100 supports a circumferentially extending O-ring seal in a ring groove so that the O-ring engages the flange portion 92 to seal the chamber 27 from the surrounding atmosphere.

The illustrated housing 26 is formed of brass or other magnetically insulative material to block flux from passing between the valve member edge 40 and the flange portion 92. The housing thus contributes to concentration of the magnetic flux in the gap 94. The housing can be formed from a suitable plastic material if desired since the flux concentrating function of the flux directing portion 90 is, not significantly diminished by the use of diamagnetic materials of this sort.

The biasing and magnetic forces acting on the valve member 30 are opposed by a differential pressure force, proportional to the difference between the output pressure and atmospheric pressure, exerted on the valve member. The output pressure is thus controlled in accordance with the value of the electrical signal from the source 14. The biasing force and the magnetic force both operate to urge the valve member toward the valve seat 34 while any pressure differential between the ambient atmospheric pressure and the output vacuum pressure urges the valve member away from the seat 34. The electrical input signal value establishes the magnetic force level applied to the valve member 30 thus establishing the output pressure level at which the forces acting on the valve member are balanced.

In the illustrated valve, the valve seat 34 is formed by a brass ring supported on a shoulder 102 formed at the core end 72. One axial side of the ring projects axially from the core end 72 to provide an annular seat surface 104 engagable by the valve member. The seat surface inscribes an effective pressure area 106 on the valve member side 36 which is subjected to ambient atmospheric pressure via the vent passageway. The remaining areas of the valve member sides 36, 38 are all exposed to the output chamber pressure. Accordingly the net pressure force acting upon the valve member at any time is the difference between the pressure force acting within the effective pressure area 106 and the output chamber pressure acting upon the corresponding effective area on the opposite valve member side 38. When the valve member is moved away from contact with the seat 34 the pressure acting on the valve member face 36 is only minimally different from atmospheric pressure because the flow area between the valve side 36 and the valve seat 34 is smaller than the cross sectional area of the passageway through the core member.

The valve seat 34 is constructed and arranged to prevent direct contact between the valve member 30 and either the core 62 or the pole piece 64. If such contact were to occur, the magnetic attraction between the valve member and the core or pole piece would be disproportionately large compared to the signal from the source 14 and the system would not function properly. The seat 34 can be formed from some other suitable nonmagnetic material.

The pressure control valve 29 operates in the following manner: Where operation of the system 10 is initiated with no electrical signal provided from the signal source 14, the pressure source 15 evacuates the chamber 27 until the biasing spring force acting on the valve member 30 is overcome by the differential pressure force applied to the valve member. The valve member 30 moves slightly away from the seat 34 causing atmospheric air to flow into the chamber 27. The valve member is stabilized at a position in which atmospheric air flow into the chamber 27 creates a differential pressure force which just equals the spring biasing force on the valve member 30. The actuator 12 is preferably constructed and arranged so that this level of output pressure is insufficient to operate the actuator 12 from its "parked" position at one extreme of its travel with the EGR valve being closed.

When an electrical signal is provided to the magnetic actuator from the signal source, the valving member 30 is magnetically attracted toward the valve seat 34 by a force which depends upon the value of the electrical signal. Accordingly, the valve member is shifted to restrict the flow of atmospheric air into the chamber 27. When the differential pressure acting on the valve member balances the applied electromagnetic force and the biasing spring force the valve member position is stabilized.

The valve member positioning provides just enough atmospheric air flow into the chamber to establish an output pressure level corresponding to the electrical input signal value (assuming the input signal is at a stable level). The vacuum source 15 constantly evacuates the chamber 27 so that, when the forces acting on the valve member are in equilibrium, the flow rate of air into the chamber 27 via the valve 29 is the same as the flow rate of air from the chamber to the vacuum source 15.

The flow restrictor 23 prevents abrupt changes in the source pressure from destabilizing the valving member by restricting the rate of change of the source pressure communicated to the output chamber 27. Hence abrupt source pressure changes do not abruptly change the output pressure.

When the input signal from the source 14 is at its maximum value, the output pressure vacuum level is maximum and the actuator 12 is operated to the limit of its travel away from the "parked" position. The EGR valve is then fully opened.

Figure 2:
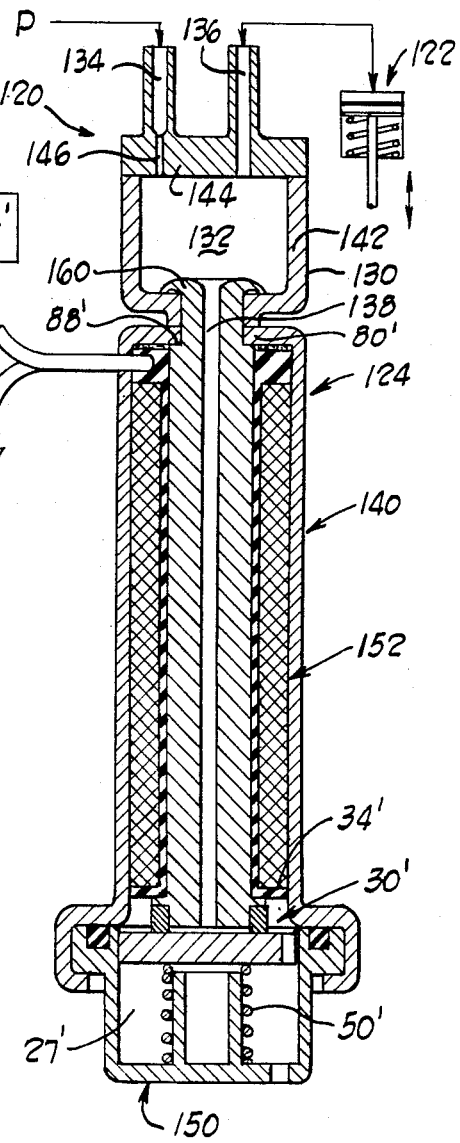

A modified system 120 constructed in accordance with the present invention for governing superatmospheric pressure levels in response to electrical input signals is illustrated by FIG. 2 of the drawings. The system 120 is constructed from a number of components which are identical to those described above in reference to FIG. 1 and accordingly like parts are indicated by corresponding primed reference characters in FIG. 2 and detailed descriptions of such parts, to the extent repetitious, are omitted.

The system 120 includes an output actuator 122 operated by superatmospheric pressure from a pressure source P via a transducer valve 124 responsive to electrical signals provided from an electric signal source 14'.

The actuator 122 is schematically illustrated and may be of any suitable or conventional type. In the embodiment of the invention illustrated by FIG. 2 the actuator 122 is a piston-cylinder type actuator in which the piston is biased to a "parked" position when a pressure at or less than atmospheric pressure is communicated to the cylinder from the transducer 124. When the pressure output from the transducer 124 increases sufficiently above atmospheric pressure, the piston is moved against the force of the biasing spring. Ultimately, when the transducer output pressure is sufficiently high, the piston is moved to the opposite extreme of its travel.

The pressure source P is preferably formed by an engine driven air compressor, or pump, of any suitable or conventional construction.

The transducer 124 includes a housing 130 defining an output pressure chamber 132 into which are communicated an input passage 134 communicating with the pump P, an output passage 136 communicating with the actuator 122 and a vent passage 138 communicating with ambient atmospheric air via an electrically controlled valve assembly 140. The valve assembly 140 governs the degree of venting of the output chamber 132 and thus controls the level of the transducer output pressure supplied to the actuator 122, with that level varying between the source pressure level and the atmospheric pressure.

The housing 130 is formed by a cup-like base member 142 connected to the control valve assembly 140 and a closure member 144 sealed across the open end of the base member. The closure member 144 is constructed and arranged to provide a portion of the output passage 136 and part of the input passage 134 including a flow restrictor 146. The flow restrictor is disposed in the input passage 134 to prevent abrupt changes in output pressure from the source P from being communicated directly to the chamber 132.

The control valve assembly 140 comprises a valve housing 150, a valve member 30' disposed in the valve housing, a valve seat 34' against which the valve member 30' can seat to block flow through the vent passage 138 and an electromagnetic actuator 152 for shifting the valve member 30' relative to the seat 34'.

The valve housing 150 is constructed identically to the valve housing 26 referred to previously except that the housing base is constructed to enable communication of the valve chamber with atmospheric air so that the valve chamber 27' is always substantially at atmospheric pressure. There are no other ports or passages associated with the base of the housing member 150.

The actuator 152 is constructed identically the same as the actuator 32 except that the core end portion 160 remote from the valve member 30' is peened over to stake the base of the housing 130 and the pole piece end section 80' tightly against the core shoulder 88'.

When the system 120 operates with no electrical signal provided to the transducer 124 the actuator 122 is maintained in its "parked" position because the output pressure from the transducer is at its minimum level and insufficient to overcome the actuator spring force. In this condition fluid from the source P to the output chamber 132 raises the output chamber pressure above atmospheric pressure just sufficiently to shift the valve member 30' away from the seat 34' against the force of the spring 50'. The output chamber is thus vented to atmosphere through the vent passage 138 and the control valve assembly. The output chamber pressure is maintained at a level where the differential pressure force acting on the valve member 30' just equals the spring biasing force. The flow restrictor 146 limits flow into the chamber 132 so that the valve member 30' can be positioned to vent a matching flow from the chamber 132.

When an electrical input signal is provided to the transducer the valve member 30' is acted on by a magnetic force corresponding to the electrical signal value. The valve member 30' is thus urged towards its seat 34' by both the magnetic force and the spring biasing force. This reduces the flow rate of air vented from the chamber 132 until the pressure differential between the output chamber and atmospheric pressure is sufficient to produce a pressure force on the valve member 30' which balances the magnetic and spring forces. The output pressure thus increases as a function of the electrical input signal value and the actuator 122 is operated. The actuator moves away from its "parked" position to a position dictated by the electrical input signal value.

While transducers embodying the invention have been illustrated and described in connection with controlling pneumatic pressure levels in automotive vehicles, the invention should not be considered limited to the precise constructions shown or to the environment described. For example, transducers embodying the invention can be used to control liquid pressures and are not necessarily limited to use in automotive vehicles. Various adaptations, modifications and uses of the invention may occur to those skilled in the art to which the invention relates and the intention is to cover hereby all such adaptations, modifications and uses which come within the scope or spirit of the appended claims.

I claim:

1. An electrically controlled pressure transducer valve comprising:
   (a) a controlled output pressure passage;
   (b) an input passage communicating with a source of pressure and with said output passage, said input passage defining a flow restriction of substantially restricting flow therethrough so that changes in source pressure are not abruptly communicated to said output passage;
   (c) a vent passage communicable with said pressure passage between said flow restriction and said output passage;
   (d) valve means for controllably varying the degree of communication through said vent passage to govern the output pressure level, said valve means comprising:
      (i) a valve member defining opposed sides forming first and second effective pressure areas respectively exposed to output and vent pressures, said effective pressure areas consituting substantial proportions of the total areas of said valve member sides, said valve member movable in response to changes in differential pressure applied to said effective pressure areas;

(ii) an electromagnetic actuator for exerting magnetic force on said valve member, said actuator comprising a coil connected to an electrical power source for producing an electromagnetic field, a core extending within said coil and a pole piece having one end section connected to said core, a thin walled tubular sleeve section closely surrounding said coil and a second end section having a peripheral portion extending circumferentially about said core and disposed adjacent said valve member for establishing a substantially uniform concentrated magnetic flux path extending peripherally about said core across a gap between said second pole piece end section and said one valve member side to minimize application electromagnetic tipping forces on said valve member; and, (iii) a nonmagnetic valve seat coacting with said one valve member side for blocking communication between said vent passage and said output passage, said valve seat positioned to prevent said valve member from engaging said core and pole piece and configured to maintain said valve member uniformly spaced from said core and pole piece when communication between said vent and output passages in blocked, said valve seat defining, with said one valve member side, one of said first and second effective pressure areas; and, (e) biasing means for biasing said valve member toward engagement with said valve seat, said valve member acted upon by differential pressure force, electromagnetic force and biasing force to govern the flow through said vent passage and control the pressure of said output port.

2. The valve claimed in claim 1 wherein said valve member is formed by a flat plate-like element and said biasing means comprises a spring urging said element towards engagement with said valve seat.

3. The valve claimed in claim 1 wherein said valve member is disposed in a chamber defining a valve member guide wall structure extending closely about the valve member, and further comprising a stop disposed in said chamber for limiting movement of said valve member in a direction away from said valve seat.

4. The valve claimed in claim 2 further including a valve member housing forming a valve member guide wall, said housing defined by a nonmagnetic material and connected to said second flux conductor end section.

5. The valve claimed in claim 4 wherein said vent passage is formed in said core and said valve seat is connected to said core surrounding a vent passage opening in said core.

6. The valve claimed in claim 1 further including structure defining an output pressure chamber communicable with said passages.

7. The valve claimed in claim 6 wherein said chamber structure forms a valve housing attached to said flux conductor.

8. An electrically operated pressure control valve comprising:

(a) a housing defining a pressure reservoir chamber having a regulated pressure outlet port and a source pressure port;

(b) flow restriction means for substantially restricting flow through said source pressure port;

(c) electromagnetic valve means for controllably venting said pressure reservoir chamber to ambient atmospheric pressure for producing controlled regulated pressure in said reservoir chamber, said valve means comprising:

(i) an electromagnet formed by a coil connectable to an electrical power source, a core having a portion extending through and surrounded by said coil, a magnetic flux guide member connected to said core and extending about said coil to form a coil housing, said core defining a passage therethrough for communicating with a vent port and with said chamber whereby the chamber may be vented through said passage;

(ii) a valve member positioned adjacent said core and movable toward and away from said core, said valve member formed from a ferromagnetic material, having an outer peripheral shape substantially conforming to the shape of said flux guide member surface adjacent said valve member, said valve member and said flux guide member surface in confronting relationship so that magnetic flux is directed substantially uniformly between said valve member periphery and said flux guide member surface through an air gap;

(iii) biasing means for producing a biasing force acting on said valve member for urging said valve member in one of said directions;

(iv) a valve seat engageable by said valve member for blocking flow in said core passage, said valve seat surrounding said core passage and defining a substantial area of said valve member subjected to the fluid pressure in said core passage whereby said valve member is subjected to differential pressure force tending to move said valve member in opposition to said electromagnetic force, said valve seat formed from nonmagnetic material and constructed to prevent said valve member from contacting said core and/or said flux guide member and for maintaining said valve member uniformly spaced from said core and said flux guide member when said core passage is blocked.

9. An electrically controlled transducer valve having an output pressure port, a source pressure port and a vent port for communicating with pressure ambient the transducer, said transducer valve comprising:

(a) a valve seat between said vent port and said output port;

(b) a ferromagnetic valve member coacting with said valve seat to define an effective pressure area comprising a substantial area of said valve member, said area subjected to a differential pressure force which varies as a function of the output pressure for urging said valve member in a direction away from said valve seat;

(c) spring means for urging said valve member toward engagement with said valve seat;

(d) electromagnetic actuator means for exerting a controllably variable operating force on said valve member, said actuator means comprising:

(i) a coil disposed about a central axis and coupled to a variable electrical power source;

(ii) a core member extending axially within said coil;

(iii) a magnetic flux conductor magnetically coupled to said core adjacent one end of said coil and forming a tubular sleeve section extending about said coil and defining an end section disposed adjacent said valve member;

(iv) said valve member disposed adjacent said flux conductor end section and adjacent an end of said core member so that when said coil is energized said valve member is urged toward said core member by a force relating to the degree of energization of the coil;

(e) said valve member defining a face disposed in a plane generally transverse to the direction of movement of said valve member, said face spaced axially from said flux conductor end section and configured so that magnetic flux is directed through the space between said valve face and said end section principally through said valve member face to provide for attractive forces between said valve face and said actuator for maintaining said face substantially in said plane; and (f) stop means for limiting the displacement of said valve member away from said valve seat to thereby assure that said spring biasing force and said magnetic actuating force substantially are unaffected by positioning of said valve member.

* * * * *